Patented Aug. 11, 1931

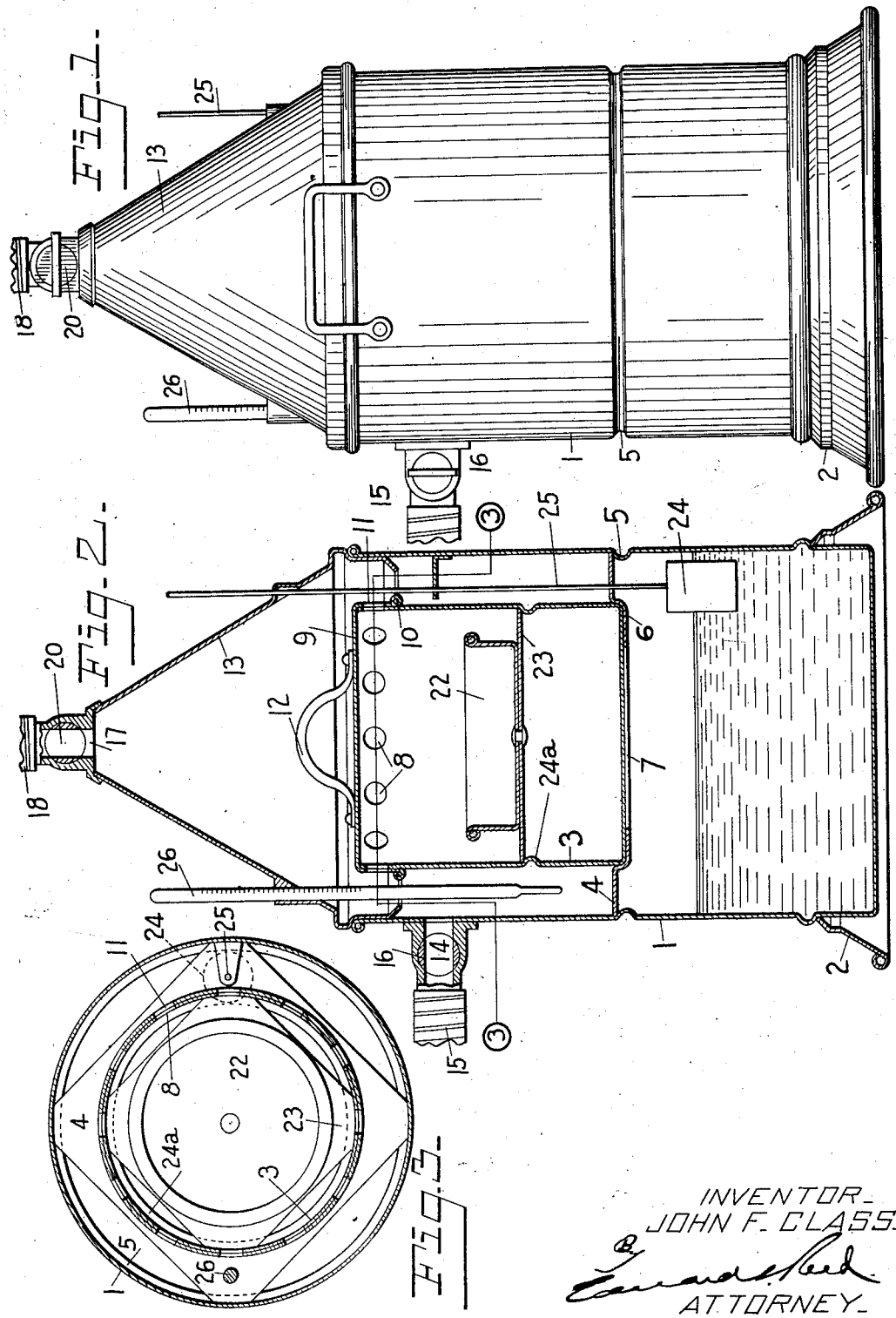

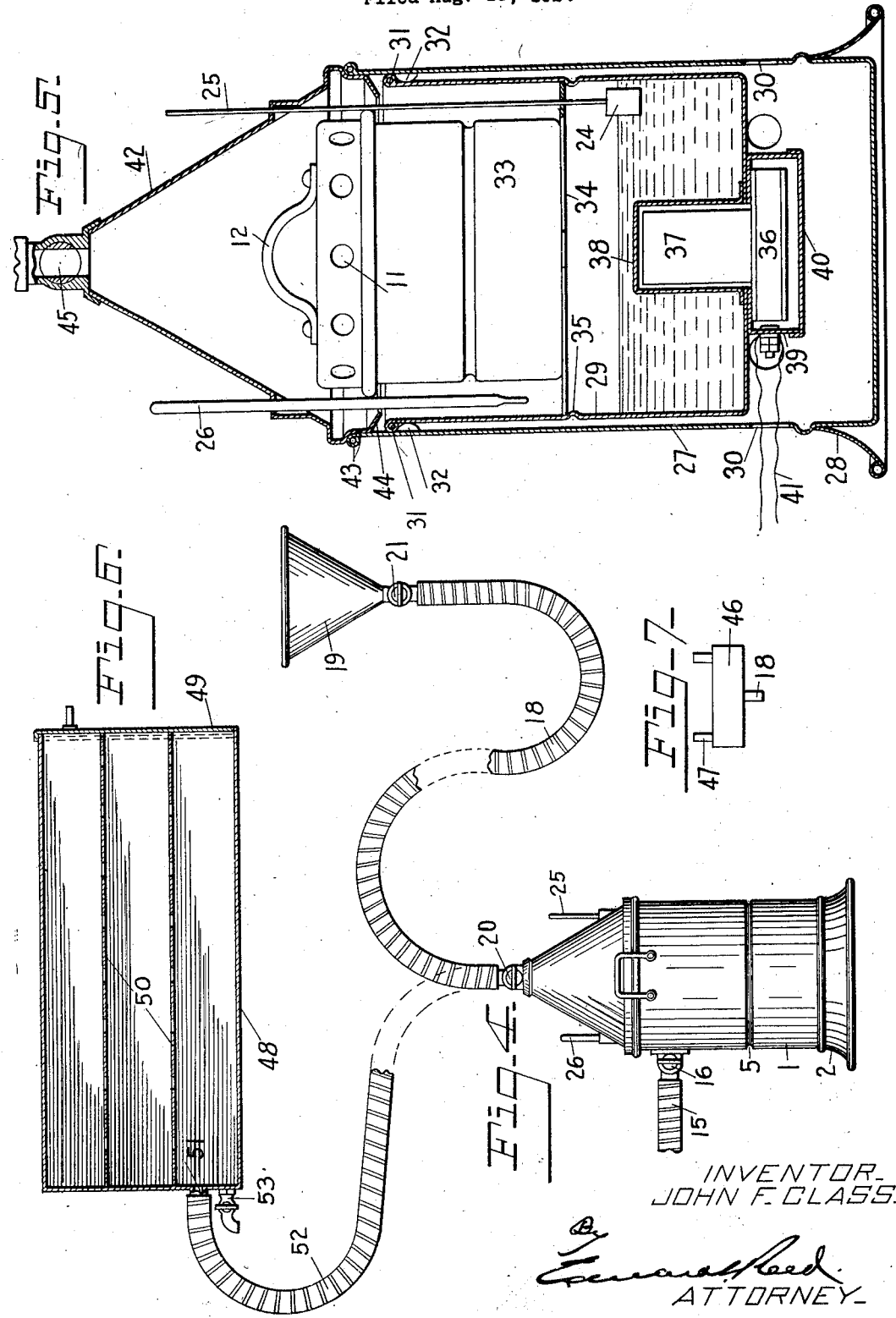

1,818,692

UNITED STATES PATENT OFFICE

JOHN F. CLASS, OF DAYTON, OHIO

FUME GENERATING AND INHALING APPARATUS

Application filed August 18, 1924. Serial No. 732,630.

This invention relates to a fume generating and inhaling apparatus.

One object of the invention is to provide an apparatus of this kind which will be simple in its construction and operation and will be readily portable so as to adapt the same for domestic use or for use in other places where a permanent installation is not desirable.

A further object of the invention is to provide an apparatus of this kind which will be self-contained and complete in a single unit.

A further object of the invention is to provide such an apparatus with an inhaling device connected with the generator in such a manner that it may be used at a point more or less remote therefrom and the temperature of the fumes regulated.

A further object of the invention is to provide in connection with such an apparatus a device for impregnating food with a fume mixture.

Other objects of the invention will appear as the apparatus is described in detail.

In the accompanying drawings Fig. 1 is a side elevation of a generator forming part of the apparatus comprising my invention; Fig. 2 is a vertical sectional view taken centrally through the device of Fig. 1; Fig. 3 is a transverse sectional view taken on the line 3—3 of Fig. 2; Fig. 4 is a side elevation of such an apparatus showing the inhaling device connected therewith; Fig. 5 is a vertical sectional view of a modified form of the invention; Fig. 6 is a sectional detail view of the cabinet adapted to be connected with the generator for impregnating food with the fumes; and Fig. 7 is a detail view of the device for use in connecting a plurality of inhalers with a single generator.

In these drawings I have illustrated two forms of my invention which are similar in their main features of construction but in one of which the generator is heated by placing the same in a stove or the like, such as a gas stove or alcohol heater, and in the other of which the heater is contained within the generator itself. It will be understood, however, that the various features of the invention may take various forms and may be embodied in devices of various kinds without departing from the spirit of the invention.

In that form of the device shown in Figs. 1-4 the generator comprises a receptacle 1 adapted to contain a quantity of water and adapted to be supported above a suitable burner or heating element to heat the water. If desired, the receptacle may be carried by a base 2 to provide a firmer support therefor. Arranged within the receptacle and above the level of the water therein is a container 3 adapted to contain the chemicals or other substances from which fumes are to be generated. This container may be supported within the water receptacle in any suitable manner which will permit the vapors or steam from the heated water to rise about the same. As here shown, the container is removably supported by means of a partition or supporting member 4 removably mounted in the receptacle and so shaped as to permit the steam or vapors from the water to pass the same. Preferably the wall of the receptacle is provided with inwardly extending projections, such as an annular rib 5, and the supporting member or partition 4 is in the form of a square plate having its corners cut away and adapted to rest upon the bead 5. The central portion of the plate is depressed, as shown at 6, to form a recess within which the bottom of the container 3 rests. If desired, the central part of the depressed portion 6 may be cut away, as shown at 7, to permit the heat and steam from the water to come directly in contact with the bottom of the container. The container is provided at its upper end with an outlet through which the fumes may escape. This outlet may be provided by leaving the upper end of the container open but I prefer to provide an outlet the capacity of which may be varied to regulate the quantity of fumes which shall escape from the container. For this purpose the container is here shown as having formed in the vertical wall thereof, and near the upper edge of that wall, a circumferential series of openings 8. The upper end of the container is closed by a suitable closure, such as a cap 9, having a flange 10 fitting snugly about the upper end of the container but rotatable thereon. The flange of this closure or cap is provided with a circumferential series of openings 11 corresponding in number and size with the openings in the container and so arranged that by the rotation of said cap the openings 11 may be moved into or out of registration with the openings 8 or may be caused to partially register with the openings 8 so as to regulate the passage of the fumes from the container. The closure may be also provided with a handle 12 by means of which it may be placed on or removed from the container or rotated thereon. Arranged above and in open communication with the water receptacle and the container is a hollow structure which constitutes a mixing chamber and this structure is preferably in the form of a closure 13 which, in the present instance, is substantially conical in shape and has its lower portion shaped to fit snugly within the top of the receptacle 1 so as to form a tight joint between the closure and the receptacle. Means are provided for introducing air into the mixing chamber and inasmuch as it is desirable that this air should be taken at a point remote from the gas burner or other heater, so as to secure pure air, I have provided the receptacle 1 with an air inlet opening 14 with which is connected a conduit 15, which is preferably flexible and which is of such a length that its receiving end may be spaced some distance from the heater. If desired, the conduit may be provided with a valve 16 to control the quantity of air to pass to the same. The steam, fumes and air all pass through the mixing chamber where they are intermingled one with the other and escape from this mixing chamber through a suitable outlet 17 with which is connected a conduit, preferably a flexible conduit, 18 leading to the point of application. The present apparatus is designed primarily for the inhaling of fumes or a fume mixture and I have therefore shown the conduit 18 as having connected therewith an inhaling device 19 which is here shown in the form of a face piece shaped to enclose the mouth and nose of the patient. The flexible conduit not only enables the patient to inhale the fume mixture at a point more or less remote from the generator and to occupy a comfortable position while so inhaling said fume mixture but it also serves to cool the fume mixture and deliver the same to the patient at the proper temperature. Preferably a valve 20 is interposed in the outlet 17 to control the flow of mixture through the conduit and, if desired, a second valve 21 may be applied to the conduit at a point adjacent to the inhaling device. By a proper adjustment of these valves the quantity of fumes delivered to the patient may be controlled and the rate of flow of the fume mixture through the conduit may be so regulated as to secure the desired cooling action in the conduit.

In the present device, I have shown the container for the fume generating substance, as having supported therein a second receptacle for a fume generating substance, as shown at 22, so that, if desired, fumes may be produced from two separate substances without intermingling the substances themselves. As here shown, the receptacle or secondary container 22 is mounted on a partition or supporting member 23, which is in the form of a square plate having its corners cut away and resting upon an inwardly extending projection or bead 24a formed in the circumferential wall of the container 3. I have also provided the apparatus with a device to indicate the level of the water in the receptacle 1 and this device consists of a float 24 resting on the water in the receptacle 1 and having connected therewith a rod 25 which extends upwardly between the walls of the container 3 and receptacle 1 and through an opening in the closure 13 so that the end of the rod projects exteriorly of the closure and the distance which it projects beyond the closure will indicate the quantity of water within the receptacle. The closure 13 also has an opening or socket to receive a thermometer 26 which will indicate exteriously of the closure the temperature within the receptacle.

In Fig. 5 of the drawings I have illustrated a form of the apparatus in which the heater is contained within the generator itself. As there shown, the apparatus comprises an outer casing 27 which, if desired, may be supported by a base 28 and in which is mounted a water receptacle 29. This water receptacle is removably mounted in the casing and is of such a diameter that its side walls will be spaced some distance from the walls of the casing so as to provide an air passage through which air may pass from inlet openings 30 formed in the casing near the bottom thereof. The water receptacle may be supported in the casing in any suitable manner but, in the present instance, its upper edge is turned outwardly to form a shoulder, as shown at 31, and this circumferential shoulder rests upon a series of inwardly extending projections or indentations 32 formed in the wall of the casing, and spaced apart so as not to interfere with the passage of air. A container 33 for the fume generating substance is supported within the water receptacle by means of a partition or supporting plate 34 which rests upon a projection or bead 35 extending inwardly from the wall of the receptacle, substantially as described in connection with that form shown in Figs. 1 to 4. The container is similar in character to that above described and the passage of the fumes therefrom is controlled in the same manner. A heater of any suitable character may be arranged within the casing so as to apply heat to the water in the water receptacle. Preferably an electric heater is supported by the bottom wall of the water receptacle. In the present apparatus, the heater is shown at 36 as arranged exteriorly of the receptacle and as having a portion 37 extending into a cavity 38 formed in the bottom wall of the heater so as to more efficiently heat the water. The heating element is arranged within a casing 39 which is rigidly secured to the bottom wall of the receptacle and is provided with a removable closure 40. The electric conductors 41 extend from the heater through one of the air openings 30 to a suitable source of supply for electric current.

A suitable structure 42 is provided to close the upper ends of the casing 27 and the water receptacle 29 and this structure or closure is of substantially the same construction as above described but, in the present instance, the depending portion or flange 43 of the closure fits within the outer casing 27 and has an inwardly extending portion or annular lip 44 which projects from the flange 43 inwardly beyond the upper edge of the water receptacle so that the products of any condensation which may take place in the closure or mixing chamber will be deflected into the water receptacle and will not enter the air space between the water receptacle and the casing. The closure is provided at its upper end with a valved outlet 45 by means of which it may be connected with a flexible conduit, and the water receptacle is also provided with a level indicator and thermometer as above described.

It is sometimes desired to connect several conduits with a single generator and this may be done by disconnecting the inhaler 19 from the flexible tube 18 and connecting with the tube a manifold 46 having a plurality of outlet nipples 47 with which other flexible tubes and inhalers may be connected.

It has been found desirable in some cases to treat the food to be eaten by the patient with the fume mixture and I have shown, in Fig. 6, a cabinet in which toast or other articles of food may be impregnated with the fume mixture. As here shown this cabinet consists of a rectangular casing 48 having a removable closure 49 at one end thereof and provided with two perforated partitions or supporting members 50. One end of the casing has formed therein an inlet opening 51 which is preferably spaced some distance above the bottom wall of the cabinet and is adapted to be connected by a flexible tube 52 with the outlet for the generator. The cabinet is also provided with one or more outlets which are here shown as valved nipples 53 and which are preferably arranged near the lower corners of the cabinet. Consequently the fumes entering the cabinet will rise through the perforated partitions and as they cool will settle to the bottom of the cabinet and escape through the outlets.

While I have shown and described certain embodiments of my invention I wish it to be understood that I do not desire to be limited to the details thereof as various modifications may appear to a person skilled in the art.

Having now fully described my invention, what I claim as new and desire to secure by Letters Patent, is:

In an apparatus of the character described, a receptacle adapted to contain water and to be subjected to heat to generate steam, a container supported within said receptacle above the level of said water and adapted to contain a fume generating substance, said container having openings near the upper end thereof, a closure fitting over the upper end of said container and having openings arranged to be moved into and out of registration with the corresponding openings in said container by the movement of said closure, a structure supported above said receptacle and forming a mixing chamber to receive said steam and said fumes, and means for introducing air into said mixing chamber, said chamber having an outlet through which the mixture of fumes, steam and air may be discharged.

In testimony whereof, I affix my signature hereto.

JOHN F. CLASS.